United States Patent [19]

Verne

[11] 4,451,306
[45] May 29, 1984

[54] MANUFACTURE OF COEXTRUDED ORIENTED PRODUCTS

[75] Inventor: Stefan Verne, London, England

[73] Assignee: BICC Public Limited Company, London, England

[21] Appl. No.: 361,778

[22] Filed: Mar. 25, 1982

Related U.S. Application Data

[63] Continuation-in-part of Ser. No. 58,304, Jul. 17, 1979, abandoned.

[30] Foreign Application Priority Data

Aug. 2, 1978 [GB] United Kingdom ............... 32053/78

[51] Int. Cl.³ ........................................... H01B 13/14
[52] U.S. Cl. ..................................... 156/51; 156/165;
    156/229; 156/244.11; 156/244.13; 174/120 SR;
    264/173; 264/210.1; 264/210.5; 264/DIG. 54;
    427/120; 428/212; 428/409; 428/910
[58] Field of Search ..................... 156/51, 52, 56, 229,
    156/165, 244.11, 244.12, 244.13; 174/110 R,
    110 SR, 120 SR, DIG. 8; 264/171, 173, 174,
    210.1, 210.5, DIG. 54; 427/118, 120; 428/409,
    212, 910

[56] References Cited

U.S. PATENT DOCUMENTS

| 2,471,752 | 5/1949 | Ingmanson | 18/59 |
|---|---|---|---|
| 3,486,196 | 12/1969 | Klenk et al. | 18/14 |
| 3,600,487 | 8/1971 | Zavasnik | 264/89 |
| 3,876,462 | 4/1975 | Carini et al. | 117/216 |
| 3,949,042 | 4/1976 | Utz | 264/173 |
| 3,965,226 | 6/1976 | Werwitzke et al. | 264/25 |
| 4,051,298 | 9/1977 | Misiura et al. | 428/383 |
| 4,077,098 | 3/1978 | Ayusawa et al. | 29/33 T |
| 4,110,385 | 8/1978 | Akutin et al. | 264/210 R |
| 4,150,082 | 4/1979 | Brick et al. | 264/174 |

FOREIGN PATENT DOCUMENTS

| 2197713 | 3/1974 | France . |  |
|---|---|---|---|
| 2347805 | 11/1977 | France . |  |
| 38-6381 | 5/1963 | Japan . |  |
| 53-24465 | 7/1978 | Japan | 156/229 |
| 773542 | 4/1957 | United Kingdom . |  |
| 1440651 | 6/1976 | United Kingdom . |  |
| 1599106 | 9/1981 | United Kingdom . |  |

Primary Examiner—Robert A. Dawson
Attorney, Agent, or Firm—Buell, Blenko, Ziesenheim & Beck

[57] ABSTRACT

A wire or other core is enclosed by two concentric extruded layers, at least one of which is of crystallizable polymeric material, by extruding the layers in succession around but spaced from the core. The first and second layers are brought into thermal and mechanical engagement with each other before the first contacts the core, and the relative thermal capacities of the parts and the temperatures of the layers as they are brought into engagement are such that as the second layer cools and increases in strength and the first layer is heated by thermal transfer from the second layer and decreases in strength, a region of least overall yield strength is formed at a position where the temperature of at least one of the parts (being made of a crystallizable polymeric material) is at a temperature between its glass transition temperature and its crystalline melting point. A braking force is applied to the first layer by a gripping device engaging it after it has cooled below its glass transition temperature and before the second layer is extruded around it and an advancing force is applied to the inner and outer layers at a place beyond the region of least overall yield strength to stretch both layers longitudinally by at least 50% in the region of least overall yield strength and so orient at least one of them and at the same time contract them until the inner layer engages the core.

4 Claims, 1 Drawing Figure

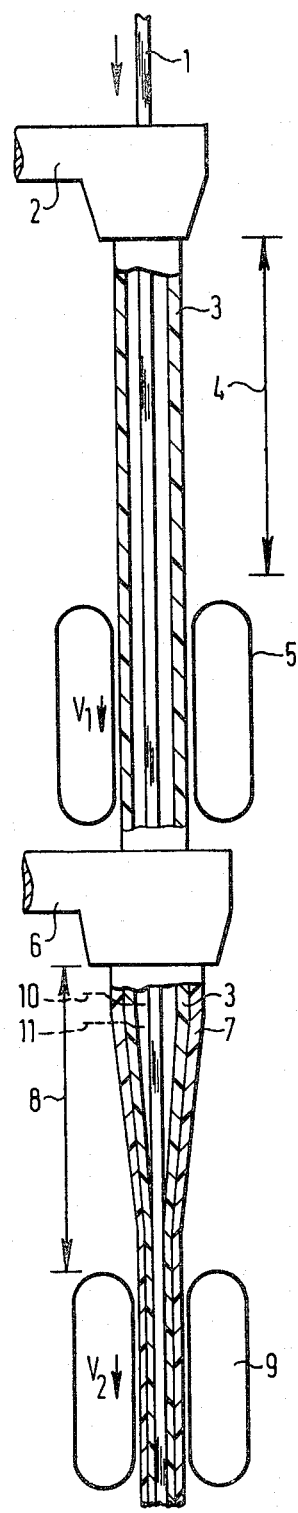

MANUFACTURE OF COEXTRUDED ORIENTED PRODUCTS

This is a continuation-in-part of my application Ser. No. 058,304 filed 07/17/79, which is now abandoned.

My invention relates to the manufacture of products comprising a core with two enclosing extruded layers, at least one of which is made of a crystallisable polymeric material, by which is meant a polymeric material which, after suitable processing, has a crystalline structure in at least part of its volume. More especially, but not exclusively, it relates to the manufacture of wires and cables that are insulated and/or sheathed with crystallisable polymeric material.

It is known that the properties of fibres or filaments made of many crystallisable polymers can be substantially improved by introducing a controlled degree of crystalline orientation in the axial direction. Such orientation is obtained by a process involving stretching the fibre or filament above the glass transition temperature but below its melting temperature range. Similarly the properties of film can be enhanced by uniaxial or by bi-axial stretching. Such stretching of the polymer produces shear-induced crystalline orientation as a result of shear-induced crystallisation or recrystallisation. Orientation of this type is usually accompanied by an increase in density (crystallisation and/or tighter packing of the polymer chains) and manifests itself in characteristic X-ray diffraction patterns. The resulting product is mechanically anisotropic, and may show substantial changes in mechanical properties, e.g. increases in modulus and tensile strength, as well as changes in chemical properties, such as improved solvent resistance and dye absorption characteristics.

It is well known that wires and other cores can be covered with one or more than one layer of thermoplastic polymeric material by extrusion, and in some known techniques the covering (or each covering) is extruded oversize and subsequently drawn down into contact with the core. In these conventional techniques however, the drawing-down process is one in which deformation of the polymeric material occurs above the melting temperature range and does not impart crystalline orientation of the type described here.

In British patent application No. 1599106 Puckowski and Howell have described how crystalline orientation of the type here described can be introduced into insulation of electric wires and cables made from these polymers and useful improvements thereby obtained in the mechanical and physico-chemical properties of the insulation, and especially improved resistance to stress cracking especially in the presence of aggressive industrial fluids. The techniques therein described are effective but are demanding of space and equipment, especially when the product to be made has two extruded parts and it is desire to orient both of them.

The object of my invention is to enable either or both layers to be oriented with less equipment, and less space occupied, than would be needed to orient one of them by this technique.

In the method of my invention;

(a) a core is enclosed by two concentric extruded layers, at least one of which is of crystallisable polymeric material, by extruding the said layers in succession around but spaced from the core;

(b) the first and second layers are brought into thermal and mechanical engagement with each other before the first contacts the core;

(c) the relative thermal capacities of the parts and the temperatures of the layers as they are brought into engagement are such that as the second layer cools and increases in strength and the first layer is heated by thermal transfer from the second layer and decreases in strength, a region of least overall yield strength is formed at a position where the temperature of at least one of said parts (being made of a crystallisable polymeric material) is at a temperature between its glass transition temperature and its crystalline melting point; and (d) a braking force is applied to the first layer by a gripping device engaging it after it has cooled below its glass transition temperature and before the second layer is extruded around it and an advancing force is applied to the inner and outer layers at a place beyond the region of least overall yeild strength to stretch both layers longitudinally by at least 50% in the said region of least overall yield strength and so orient at least one of them and at the same time contract them until the inner layer engages the core.

The degree of longitudinal stretching may be much more than 50% ranging up to tenfold stretching or beyond for some polymeric materials.

The two layers may be made of the same crystallisable polymeric material or of two different crystallisable polymeric materials; if they are identical or at least have a substantial overlap in their respective ranges between their glass transition temperatures and crystalline melting points both may be oriented in the elongation step; when these ranges do not overlap to any substantial extent a useful degree of orientation in both layers may nevertheless be achieved in some cases provided the material of the second layer has the higher of the two ranges. If only one of the layers is of a crystallisable polymeric material then clearly only that layer can be given crystalline orientation; this may be either the first or the second layer.

In most cases it is desirable to "anneal" the polymeric material after stretching by heating to a temperature above the stretching temperature but still below the melting temperature range.

The method described can be used to make a wide range of insulated wires and cables, including products suitable for use in wiring buildings, aircraft, ships and vehicles, electrical equipment and appliances, telecommunications, as well as control and industrial power cables.

The method of the invention can usefully be applied to the following types of polymers (amongst others).

Polyesters and Poly (ester-imides)
Polyamides and Poly (amide-imides)
Polyolefins (including polyethylene) [especially high density type] and polypropylene and copolymers)
Polycarbonates
Polyphenylene oxides
Polysulphones
Polyvinylidene fluoride
Homopolymers and copolymers based on fluoro- and perfluoro vinyl monomers, and
Substantially linear aromatic homopolymers and copolymers consisting of chains of mono or polycyclic aromatic groups linked by one or more of:

—O—    —S—

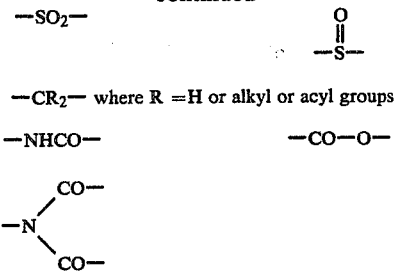

and other groupings including those containing P or P and N. Some mixtures of these polymers can also be used. Preferred polymers of the last-mentioned group include those described in one or more of British Patent Specifications Nos. 971,227, 1,016,245, 1,019,266, 1,019,458, 1,078,234, 1,086,021, 1,102,679, 1,153,035, 1,153,527, 1,164,817, 1,177,183, 1,383,383, 1,387,303, and 1,414,421, 1,414,422, and 1,414,423. Some polymers of this last mentioned group can be effectively used in the oriented state for insulation of cables designed for service at or above 150° C., despite the fact that the same polymers applied by the conventional extrusion techniques have been considered unsuitable for electric cable use because of poor resistance to stress cracking and/or poor solvent resistance.

The invention will be further described, by way of example, with reference to the accompanying FIGURE which is a diagrammatic plan of the main parts of a production line for making an insulated wire by the method of the invention.

A bare wire 1 is taken from any suitable source (not shown) and a first cross-head extruder 2 forms around it an oversize tube 3 of crystallisable polymeric material; the wire is centred in the tube sufficiently to avoid adhesion of the tube to the wire. The tube 3, with the wire inside it, passes through a cooling zone 4, which may comprise a water trough or a spray or other force cooling means, and in which it is cooled to a temperature, below its glass transition temperature, at which it can be gripped, whereupon it is gripped by a caterpillar device which controls its advance at an appropriate speed $V_1$.

The assembly now passes through an extruder station consisting of a second cross-head extruder 6 which forms a second tube 7 of crystallisable polymer around and in intimate contact with the tube 3. The assembly now passes through a second cooling zone 8 to a take-up caterpillar 9 which advances the assembly at a speed $V_2$ which is at least 1.5 times $V_1$ and may be up to around ten times $V_1$, and thence to reeling equipment.

On emerging from the second extruder 6 into the cooling zone 8 the temperature of the outer tube 7 is well above the crystalline melting point of its material and it contributes little or nothing to the yield strength of the composite tube; nevertheless no substantial elongation takes place at this point because the cool inner tube 3 gives the assembly substantial strength. As the assembly travels through the cooling zone 8, the outer tube cools until at a point 10 its temperature falls below its crystalline melting point and it begins to contribute some appreciable strength; at the same time it heats the inner tube 3 until at a point 11 (arranged to be downstream of 10 by choosing the temperature at which the tube 7 is extruded and that of the tube 3 when it reaches the extruder 6 to suit the relative cross-sections of the tubes) its temperature exceeds the glass transition temperature of its material; the consequent loss of yield strength of the inner tube exceeds the concurrent increase in yield strength of the outer layer, and the tubes now elongate together to the extent required by the speeds $V_1$ and $V_2$, thereby orienting the material of both the tubes.

The use of two concentric layers greatly reduces the risk of electrical failure due to "pinhole" faults either initially from manufacturing imperfections or after a period of service due to environmental stress-cracking propagated from a surface of the insulation.

What I claim as my invention is:

1. A method of making a product comprising a core enclosed by two radially successive concentric extruded layers, at least one of which is of crystallisable polymeric material in which
   (a) a core is enclosed by two concentric extruded layers, at least one of which is of crystallisable polymeric material, by extruding the said layers in succession around but spaced from the core;
   (b) the first and second layers are brought into thermal and mechanical engagement with each other before the first contacts the core;
   (c) the relative thermal capacities of the parts and the temperatures of the layers as they are brought into enagagement are such that as the second layer cools and increases in strength and the first layer is heated by thermal transfer from the second layer and decreases in strength, a region of least overall yield strength is formed at a position where the temperature of at least one of said parts (being made of a crystallisable polymeric material) is at a temperature between its glass transition temperature and its crystalline melting point; and
   (d) a braking force is applied to the first layer by a gripping device engaging it after it has cooled below its glass transition temperature and before the second layer is extruded around it and an advancing force is applied to the inner and outer layers at a place beyond the region of least overall yield strength to stretch both layers longitudinally by at least 50% in the said region of least overall yield strength and so orient at least one of them and at the same time contract them until the inner layer engages the core.

2. A method as claimed in claim 1 in which the core is a wire.

3. A method as claimed in claim 1 in which both layers are of crystallisable polymeric material and each of them is at a temperature between its glass transition temperature and its crystalline melting point in the region of least overall strength, whereby both are oriented.

4. A method as claimed in claim 3 in which both layers are of the same material.

* * * * *

UNITED STATES PATENT AND TRADEMARK OFFICE
CERTIFICATE OF CORRECTION

PATENT NO. : 4,451,306
DATED : May 29, 1984
INVENTOR(S) : Stefan Verne

It is certified that error appears in the above-identified patent and that said Letters Patent is hereby corrected as shown below:

Column 3, line 3, "$\underset{\underset{S}{\overset{\overset{O}{\|}}{}}}{}$" should be -- $\underset{\underset{C}{\overset{\overset{O}{\|}}{}}}{}$ --.

Column 3, line 44, --5-- should be inserted after "device".

$\mathcal{S}$igned and $\mathcal{S}$ealed this

Twelfth Day of March 1985

[SEAL]

Attest:

DONALD J. QUIGG

Attesting Officer

Acting Commissioner of Patents and Trademarks